Figure 1:
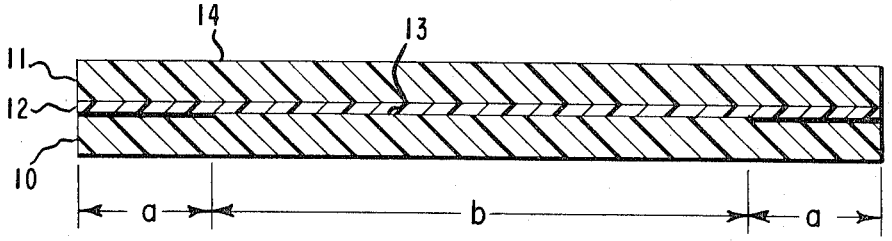
Figure 2:
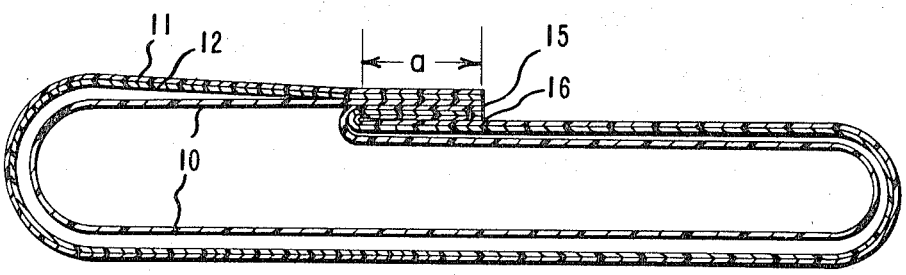
Figure 3:
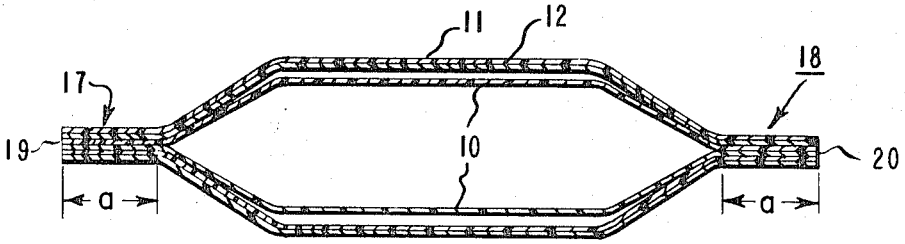

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 6

T903,012

LAMINAR STRUCTURES AND PACKAGES THEREOF AND METHOD OF MANUFACTURE

James Maurice Quinn, Tonawanda, N.Y., and Edgar Davis Swain, Westport, Conn., assignors to E. I. du Pont de Nemours and Company, Wilmington, Del.

Continuation of application Ser. No. 61,481, Aug. 5, 1970, which is a continuation of application Ser. No. 655,076, July 21, 1967. This application Oct. 4, 1971, Ser. No. 186,405

Int. Cl. B32b *27/08*

U.S. Cl. 161—227

1 Sheet Drawing. 15 Pages Specification

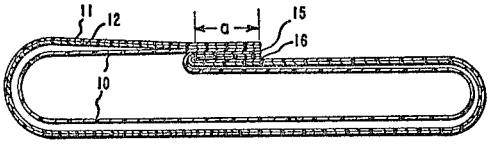

In a double-wall laminar packaging structure formed of an outer wall of film coated on its inner side with a vinylidene chloride copolymer, and an inner wall of film bonded to the inner side of said outer wall only along edge areas; the improvement wherein said film of said outer wall is an organo thermoplastic polymer film, such as polyethylene terphthalate, polypropylene or nylon, and the film of said inner wall is a polyolefin film, such as polyethylene or an ionic hydrocarbon copolymer, and wherein said edge areas comprise polyolefin film directly bonded to vinylidene chloride copolymer-coated surfaces of said outer wall of film.

Oct. 3, 1972

J. M. QUINN ET AL

T903,012

LAMINAR STRUCTURES AND PACKAGES THEREOF
AND METHOD OF MANUFACTURE
Original Filed July 21, 1967

INVENTORS
JAMES MAURICE QUINN
EDGAR DAVIS SWAIN

BY Claude L. Beaudoin

ATTORNEY